UNITED STATES PATENT OFFICE.

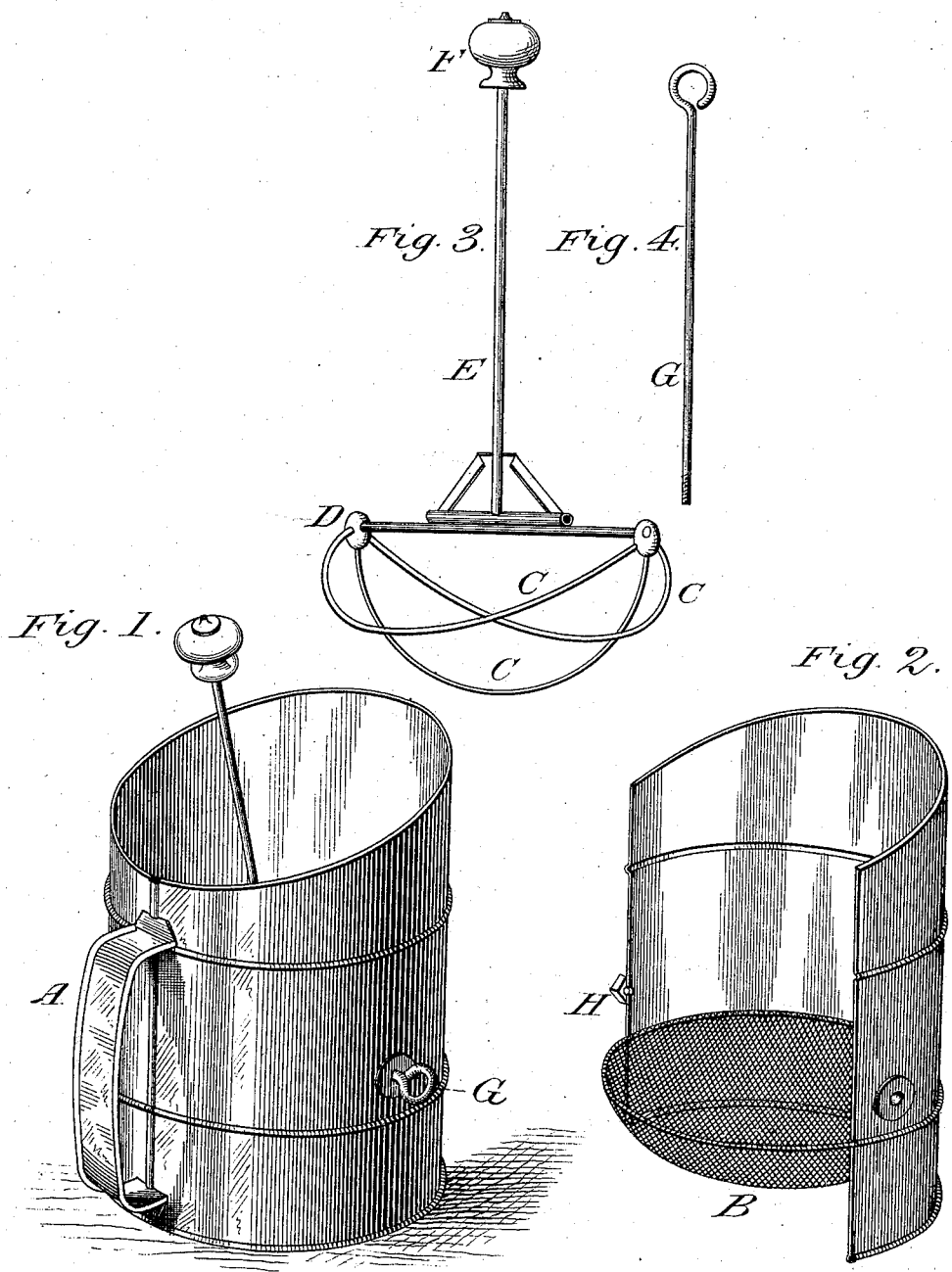

LEWIS E. BROWN, OF CINCINNATI, OHIO.

IMPROVEMENT IN SCOOP, SIFTER, AND STRAINER COMBINED.

Specification forming part of Letters Patent No. 216,996, dated July 1, 1879; application filed October 21, 1878.

*To all whom it may concern:*

Be it known that I, LEWIS E. BROWN, of Cincinnati, Hamilton county, Ohio, have invented a new and useful Improvement in Flour and Meal Sifter and Strainer and Scoop. The following is a full description of the same, reference being had to the accompanying drawings, and the letters and figures on the same, which form a part of this specification.

The nature of my invention consists in the construction of a combination flour and meal sifter and strainer and scoop provided with an interior lever agitator, for the purpose of agitating and separating all foreign substances from the flour, meal, or any ingredient you may desire to sift or strain.

In order to enable others skilled in the art to make and use the same, I will now proceed to describe the manner of its construction and operation, referring to the annexed drawings, in which—

Figure 1 is a side elevation of my combination flour and meal sifter, strainer, and scoop, with agitator in the interior of the same in position for sifting or straining, and represents a cylinder of any desired dimensions, constructed of tin-plate or other suitable material, cut inclined at the top suitable to use for a scoop, with a suitable handle, A, on the side. On the inside of the cylinder, near the bottom, is soldered a semi-spherical wire-cloth sieve, B, as shown in section.

Fig. 2 of annexed drawings represents a longitudinal half-section of the cylinder with semi-spherical wire-cloth sieve soldered in near the bottom.

Fig. 3 represents my lever-agitator, which is constructed of three semicircular wires or rods, C C C, attached at their ends to a rod or wire, on which is soldered a hollow tube, D, for a journal to work on axle, Fig. 4. On the center of the tube or journal D is soldered a handle, E, which is made of a rod, with a suitable knob, F, made of wood, porcelain, or other suitable material, riveted on the top.

Fig. 4 represents an axle, G, for the agitator to work on, formed of a rod or of wire, with a thread cut on one end, and a ring or other convenient handle on the other end, to be put through a hole in the center of the cylinder and through the tube on journal D on the agitator, and screwed fast into a nut, H, which is soldered on the outside of the cylinder.

The agitator, when in position as described, is easily and rapidly worked backward and forward on the axle G with one hand, while you hold the sifter or strainer by the handle A with the other hand; and the semicircular rods C C C brush over the wire-cloth and separate any foreign substances from the ingredients desired to be sifted or strained, and at the same time keep the meshes in the wire-cloth from becoming filled or clogged.

I do not claim a combined flour and meal sifter and strainer and scoop, nor one provided with an interior agitator, as this is not new; but, Having fully described my invention, what I do claim, and desire to secure by Letters Patent, is—

The combination, with the flour and meal sifter, strainer, and scoop, of the lever-agitator shown in Fig. 3, and made as described, the axle for the agitator to work upon, and nut H, soldered on the side of cylinder, as shown in section, Fig. 2, to hold the axle rigidly in place, all substantially as and for the purposes set forth.

In witness whereof I hereunto set my hand and seal this 8th day of October, A. D. 1878.

LEWIS E. BROWN. [L. S.]

Witnesses:
 GEO. EHLERDING,
 WM. BALM.